(12) United States Patent
Hirose et al.

(10) Patent No.: US 6,718,618 B2
(45) Date of Patent: Apr. 13, 2004

(54) METHOD OF MANUFACTURING SUPERCONDUCTING CABLE

(75) Inventors: Masayuki Hirose, Osaka (JP); Takato Masuda, Osaka (JP); Takeshi Kato, Osaka (JP); Yoshihisa Takahashi, Yokohama (JP); Kimiyoshi Matsuo, Yokohama (JP); Shoichi Honjo, Yokohama (JP); Tomoo Mimura, Yokohama (JP); Terumitsu Aiba, Yokohama (JP)

(73) Assignees: Sumitomo Electric Industries, Ltd., Osaka (JP); Tokyo Electric Power Company, Tokyo (JP)

( * ) Notice: Subject to any disclaimer, the term of this patent is extended or adjusted under 35 U.S.C. 154(b) by 262 days.

(21) Appl. No.: 10/045,027

(22) Filed: Jan. 15, 2002

(65) Prior Publication Data

US 2002/0148101 A1 Oct. 17, 2002

(30) Foreign Application Priority Data

Jan. 15, 2001 (JP) .................................... P.2001-007050

(51) Int. Cl.$^7$ ................................................ H01L 39/24
(52) U.S. Cl. ....................... 29/599; 174/15.4; 174/15.5; 138/113

(58) Field of Search ........................... 29/599; 138/113; 174/15.4

(56) References Cited

U.S. PATENT DOCUMENTS

| 3,604,833 A |   | 9/1971 | Beck |
|---|---|---|---|
| 3,758,701 A | * | 9/1973 | Schmidt ....................... 174/28 |
| 3,810,491 A | * | 5/1974 | Hildebrandt ................. 138/149 |
| 4,336,420 A | * | 6/1982 | Benz ......................... 174/125.1 |
| 4,397,807 A | * | 8/1983 | Bahder et al. ............... 264/512 |

FOREIGN PATENT DOCUMENTS

| JP | 9-134620 | 5/1997 |
|---|---|---|
| JP | 2001-67950 | 3/2001 |

* cited by examiner

Primary Examiner—Carl J. Arbes
(74) Attorney, Agent, or Firm—Foley & Lardner

(57) ABSTRACT

A superconducting cable is manufactured by providing spacers 12 in a plurality of cores 2 at the time of stranding of the cores 2, and removing the spacers 12 before the stranded cores 2 are housed in a thermally insulated pipe and housing the cores into the thermally insulated pipe while the strands are held in a slacked state. By means of temporal interposition of the spacers, there is easily manufactured three cores having sufficient slack to manage thermal contraction which occurs when the cores are cooled in the thermally insulated pipe.

5 Claims, 4 Drawing Sheets

METHOD OF MANUFACTURING SUPERCONDUCTING CABLE

BACKGROUND OF THE INVENTION

1. Field of the Invention

The present invention relates to a method of manufacturing a superconducting cable. More particularly, the present invention relates to a method of manufacturing a superconducting cable to ensure contraction allowance of a cable core for cooling.

2. Description of the Related Art

After having been laid down, a superconducting cable is cooled by a coolant, such as liquid nitrogen in the cable. The outermost layer of the cable is at ambient temperature, whereas the inside of the cable remains at about −200° C. Hence, a temperature difference between the inside and outside of the cable is 200° C. or more. Metal constituting the cooled cable is subjected to a contraction of about 0.3%; more specifically, the cable is subjected to a thermal contraction of about 30 cm every 100 meters. A conductor of the superconducting cable is formed by stranding a plurality of cable cores. Both ends of the cable are fixed to an interconnection section or a terminal connection section. Hence, if the thus-stranded cable core undergoes contraction, the strand is fastened much tighter. As a result, the cable is subjected to the tensile stress and the side pressure at bending parts, thereby inflicting damage on the superconductor, whose performance is greatly degraded by mechanical stress. For this reason, a mechanism which manages the thermal contraction is required.

The technique as described in Japanese Patent Unexamined Publication No. Hei. 09-134620 has hitherto been known as a technique for managing such thermal contraction. Specifically, an intermediate substance having a large thermal contraction rate is provided in the center of three cable cores, and the three cables are stranded with the intermediate substance interposed therebetween. The strands of three cable cores change in diameter by virtue of thermal contraction of the intermediate substance, thereby managing thermal contraction.

The above-described technique requires use of the intermediate substance having a large thermal contraction rate in addition to the cable cores, thus increasing the number of components.

SUMMARY OF THE INVENTION

An object of the present invention is to provide a method of manufacturing a superconducting cable which can manage thermal contraction without integrating another member with cable cores.

The present invention achieves the object by temporarily providing a spacer between cable cores so that the cores can be housed in a thermally insulated pipe in a slacked state.

The present invention provides a method of manufacturing a superconducting cable comprising:
 providing spacers in a plurality of cores at the time of stranding of the cores; and
 removing the spacers before the stranded cores are housed in a thermally insulated pipe, and housing the cores into the thermally insulated pipe while the strands are held in a slacked state.

When a plurality of cores; for example, three cores, are stranded, spacers are interposed between the cores. The cores are stranded at intervals corresponding to the thicknesses of the spacers. In case that the thus-stranded cores are housed in the thermally insulated pipe, the spacers are removed and the cores are housed in the pipe while slack corresponding to the thicknesses of the spacers is maintained. At this time, if the thicknesses of the spacers are optimized, it is possible to easily manufacture of three cores having sufficient slack to manage the thermal contraction which occurs when the cable is cooled in the thermally insulated pipe.

Preferably, removal of the spacers is to be performed immediately before a process of housing the cores into the thermally insulated pipe. Usually, the thermally insulated pipe has a structure such that a vacuum thermal insulation layer is formed between an outer pipe and an inner pipe, and the stranded cores are housed in the inner pipe. When the inner pipe is formed from stainless steel, the stainless steel plate covers the outer circumferential surfaces of strands of the cores. Joints between metal plates are sequentially welded by means of a welder. The spacers are removed before the cable cores are introduced into the welder. When the inner pipe is formed from copper or aluminum, in some cases metal is extruded to the outer circumferential surface of the cable cores by means of an extruder. In this case, the spacers are removed before the cables are introduced into the extruder.

Removal of the spacers is performed easily by drawing the spacers from grooves between the stranded cores. For instance, the spacers are drawn sideways of a line and taken up immediately before the cores are introduced into the welder or extruder.

Preferable material for the spacer is a substance having flexibility and strength across the thickness thereof. More specifically, the spacer material includes fluororesin-based material, vinyl-based material, rubber-based material, paper-based material, and felt-based material.

A suitable geometry of the spacer is the shape of an elongated tape. Particularly, the thickness of the spacer preferably satisfies the following requirements.

(1) An amount of required slack $A0 \leq$ an amount of design slack $A1$,
 where the amount of required slack $A0$ is expressed by a rate of thermal contraction of the core ($\{$(the length of one pitch of the core after contraction/the length of one pitch of the core before contraction)$-1\}100$), and the amount of design slack $A1$ is expressed by $\{(L1/L2)-1\}100$, provided that the length of one pitch of the cores having the spacers is taken as $L1$ and the length of one pitch of cores not having spacers is taken as $L2$; and (2) a diameter of an enveloping circle $\leq$ an inner diameter $B$ of the thermally insulated pipe,
 where the diameter of the enveloping circle corresponds to the diameter of a circle circumscribing the stranded cores having spacers.

Requirement (1) is for managing the contraction of cores. Selection between full management of a required amount of slack or partial management of the same may be determined by design, as required. Requirement (2) is for preventing damage to the cores, which would otherwise be caused when the cores come into contact with the interior surface of the thermally insulated pipe at the time of machining of the thermally insulated pipe. In consideration of tolerances, the inner diameter $B$ of the thermally insulated pipe is preferably set to the minimum value.

DETAILED DESCRIPTION OF THE INVENTION

Figure 1:
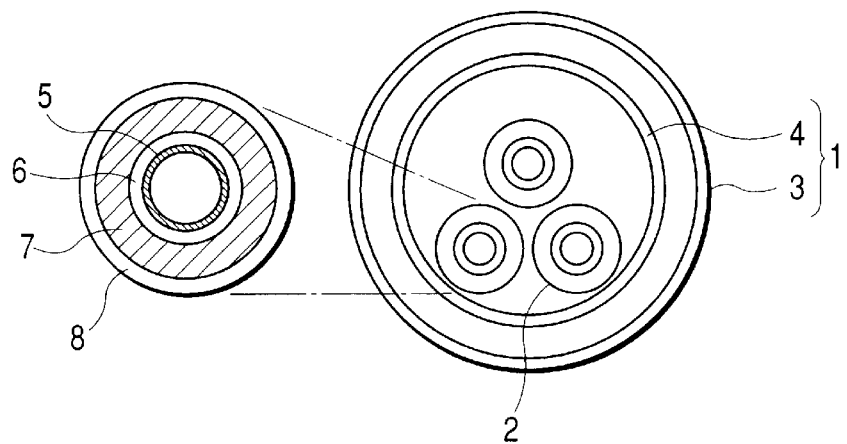
FIG. 1 is a cross-sectional view of a superconducting cable according to the present invention.

Prior to description of a manufacturing method according to the present invention, the structure of a superconducting cable to be manufactured by the method will first be described by reference to FIG. 1. The cable has three cores 2 housed in a thermally insulated pipe 1. The thermally insulated pipe 1 is constituted by providing thermal insulation material, such as multi-layer thermal insulation (not shown), between an outer pipe 3 and an inner pipe 4, and evacuating a space defined between the pipes 3, 4. The cable cores 2 are stranded with sufficient slack to enable management of thermal contraction. The outer and inner pipes 3, 4 are formed into corrugated pipes. Each of the cable cores 2 comprises, in order from the center, a former 5, a superconductor 6, an electrical insulation layer 7, and a shield layer 8. A protective layer (not shown) may be provided outside of the shield layer 8. In the present embodiment, the former 5 is hollow. The internal space of each former 5 and the space defined between the inner pipe 4 and the cable cores 2 serve as coolant channels. As the superconductor 6, oxide superconductors, such as a Y-based superconductor or a Bi-based superconductor, are preferable. Materials that can be used as the electrical insulation layer 7 include a paper tape soaked with coolant, or a composite paper composed of a paper tape and a plastic tape, and the electrical insulation layer 7 is formed by winding such paper tape. Liquid nitrogen or liquid helium can be utilized for the coolant.

In order to allow slack in the strands of three cores, the cable is manufactured according to a method provided below after manufacture of cable cores.

Figure 2:
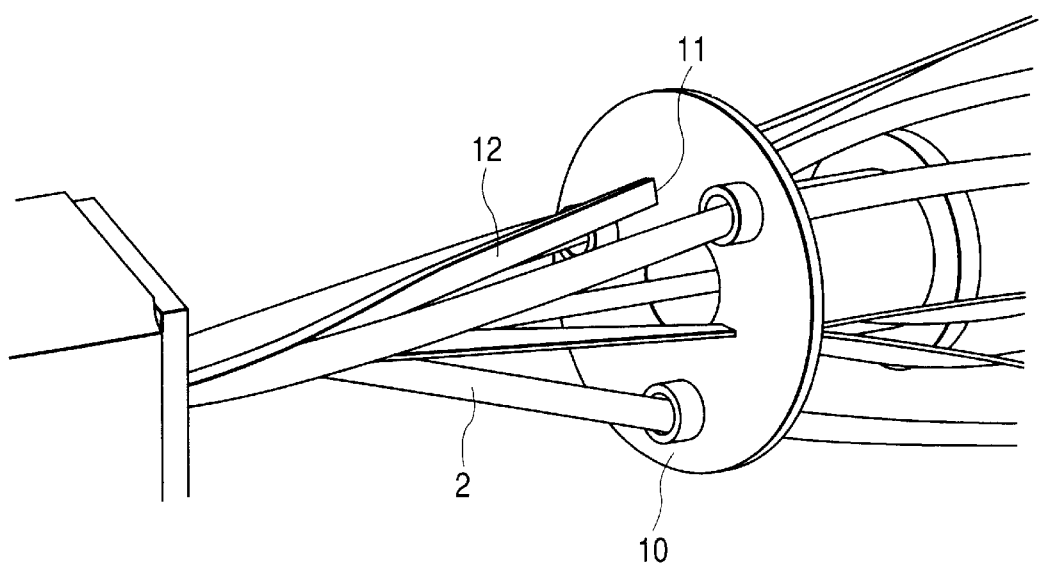
FIG. 2 is a descriptive view showing a process of stranding cores involved in a method of manufacturing the sperconducting cable according to the present invention.
Figure 3:
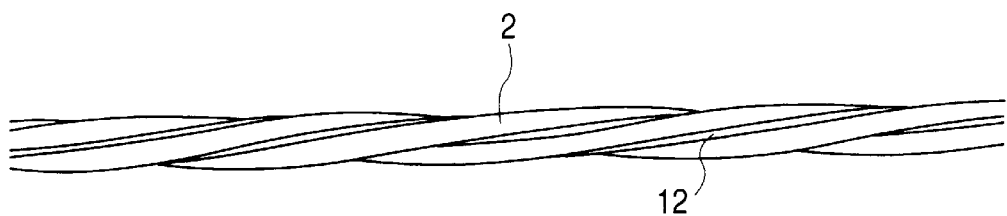
FIG. 3 is a side view showing three cores into which spacers are sandwiched between cores, under the method according to the present invention.

Spacers are interposed among the three cores at the time of stranding of the cores as shown in FIG. 2. Rectangular slits 11 are formed in a batten plate 10 which is to act as a guide at the time of stranding of cores. A tape-like spacer 12 is caused to pass through each of the slits 11. As shown in FIG. 3, the spacers 12 are sandwiched between the cores 2, thereby producing three cores with the side surfaces of the spacers 12 exposed through grooves among the strands.

Figure 4:
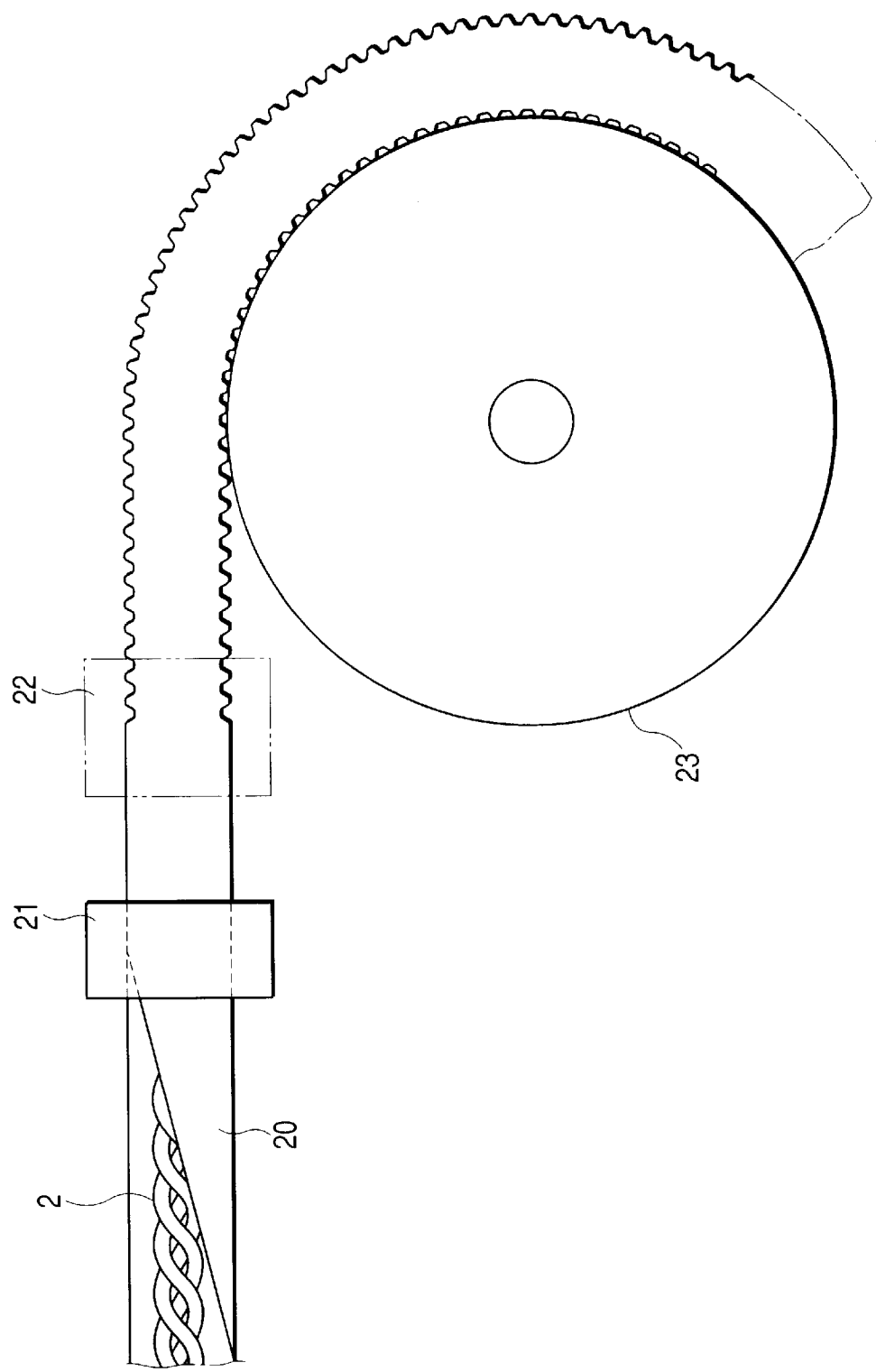
FIG. 4 is a descriptive view showing a process of housing cores in an inner pipe.

The three cores with the spacers are housed in the inner pipe 4. As shown in FIG. 4, the inner pipe is usually produced by covering an outer circumferential surface of the thus-stranded cores 2 with a metal plate 20 (e.g., a stainless plate) and sequentially welding joints in the metal plates 20 with a welder 21. In this stage, the inner pipe is not a corrugated pipe but a linear pipe. Subsequently, the inner pipe 4 is introduced into a corrugator 22, where the pipe 4 is corrugated. The thus-corrugated pipe 4 is taken up on a drum 23. The spacers 12 are removed before the stranded cores is introduced into the welder 21.

The spacers 12 can be easily removed by being drawn from the grooves defined among the stranded cores. For instance, before the time of introduction of the stranded cores into the welder 21, the ends of the stranded cores have been subjected to terminal treatment for preventing spreading of the cores, and the respective spacers 12 have been drawn from the cores. Since the spacers 12 are sandwiched merely among the cores 2, the spacers 12 can be easily pulled by hand. Preferably, the spacers are drawn sideways of the production line and taken up.

By means of such a production step, the three cores can be housed in the corrugated inner pipe 4 with slack corresponding to the thickness of the spacers 12. The slack is maintained not only during the process of processing the corrugated inner pipe but by the end of assembly of the cable.

(Example of Trial Calculation)

Trial calculation of how thick a spacer is to be for practical used is carried out. Explanations are given of a case where stranded three cores are housed in a thermally insulated pipe (i.e., an inner pipe) of a superconducting cable having an outer diameter of 135 to 136 mm so that the cable can be stored into a pipe line having an inner diameter of 150 mm.

The present embodiment adopts a core outer-diameter D of 39.5 mm; an inner diameter B of 93 mm for a corrugated inner pipe; and a core stranding pitch of 1000 mm. A standard inner diameter of the corrugated inner pipe is 95 mm. However, in consideration of tolerances of +0 mm and −2 mm, a smallest inner diameter of 93 mm is adopted.

<Concept of Spacer Thickness>

As described previously, metal constituting the cable material is subjected to a contraction of about 0.3%. Here, a required amount of slack A0 is taken as 0.3%, and trial calculation this time takes into consideration full management of the required amount of slack A0. In order to impart a slack of 0.3% to the core after assembly of the superconducting cable, desirably as much slack as possible is imparted to the cores at the time of manufacture of the corrugated inner pipe. A conceivable measure is to maximize a spacer thickness.

If the spacer thickness is made excessively large, the profile of strands of three cores becomes apt to deformation at the time of manufacture of a cable core. There must also be taken into consideration constraints on production; that is, the outer diameter of a core being sufficient to house the core into the inner pipe; and obviation of a risk of causing a failure to weld the inner pipe at the time of manufacture of the inner pipe or a risk of inflicting damage to cores.

On the basis of a result of review of these factors, trial calculation of a spacer thickness is carried out with a view toward housing the stranded cores into the inner pipe without inflicting damage to the cores and assuring a design slack of about 0.4%.

<Procedures of Trial Calculation>

An amount of design slack A1 is expressed mathematically by Eq. 1, provided that the length of one pitch of cores with spacers is taken as L1 and the length of one pitch of cores without spacers is taken as L2.

$$A1=\{(L1/L2)-1\}100 \quad \text{(Eq.1)}$$

The thickness "t" of a spacer is determined such that $0.3\% \leq A1$ and the diameter of an enveloping circle circumscribing the three cores with spacers assumes a value of $\leq 93$ mm.

Figure 5:
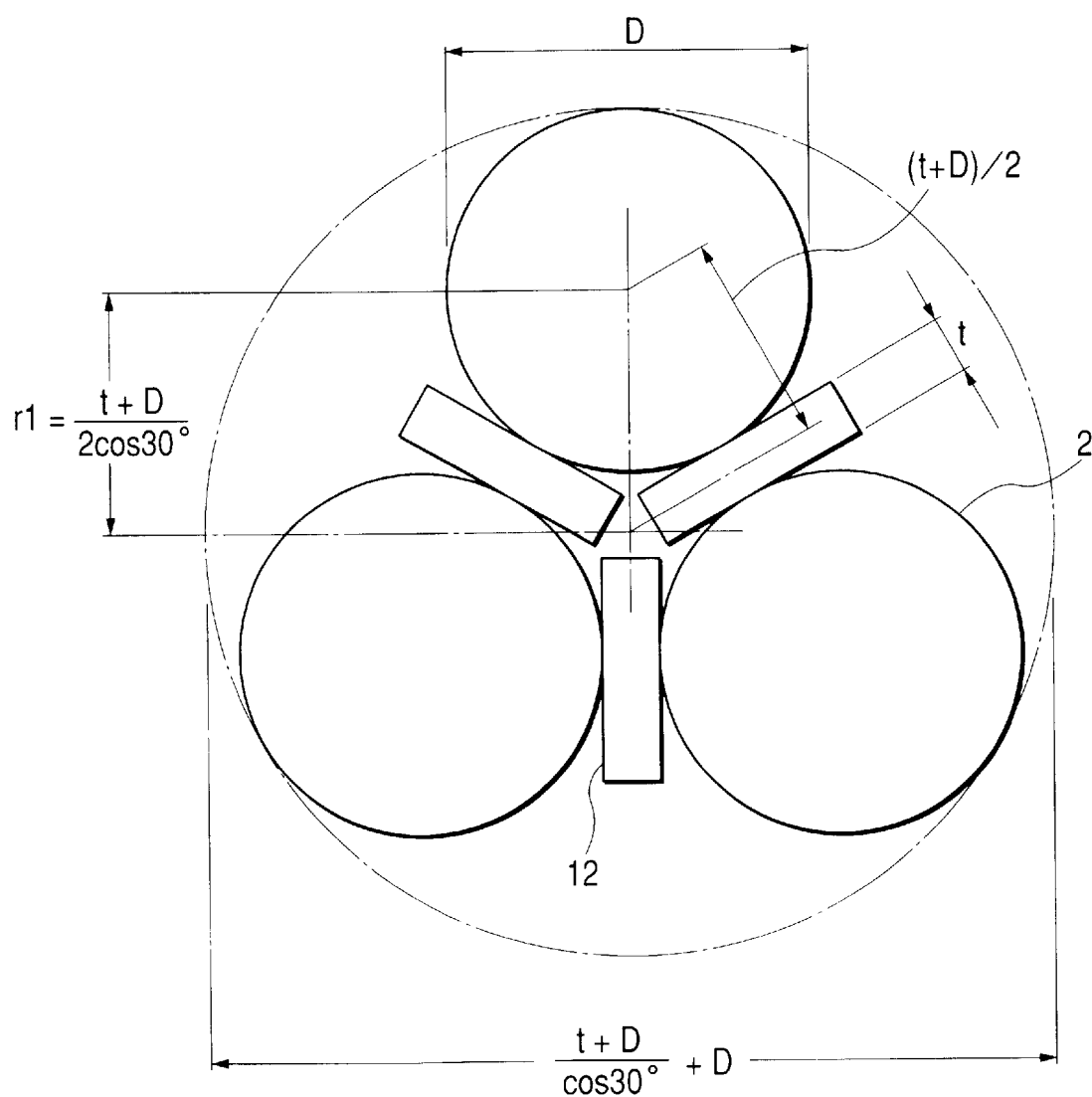
FIG. 5 is a cross-sectional view showing three cores having spacers interposed therein.

Lengths L1, L2 can be determined as follows. FIG. 5 is a cross-sectional view of a three-core strand into which cable cores 2, each having a diameter D, are stranded while tape-like spacers 12 having a thickness "t" are sandwiched between the cable cores.

As is obvious from the drawing, a distance r1 from the center of the enveloping circle circumscribing the three cores having the spacers to the center of each core is determined by Eq. 2.

$$r1 = \frac{t+D}{2\cos 30°} \quad \text{Eq. 2}$$

A distance r2 from the center of the enveloping circle circumscribing the three cores not having spacers (unillustrated) to the center of each core is determined by Eq. 3.

$$r2 = \frac{D}{2\cos 30°} \quad \text{Eq. 3}$$

In general, the length L per pitch of the stranded three cores is expressed by Eq. 4, provided that a distance from the center of the enveloping circle circumscribing the three cores to the center of each core is taken as "r."

$$\text{Core Length} = \sqrt{(2r\pi)^2 + \text{pitch}^2} \quad \text{Eq. 4}$$

By means of substituting r1 or r2 into "r," L1 and L2 are expressed by Eq. 5 and Eq. 6, respectively.

$$L1 = \sqrt{\left(\frac{(t+D)}{\cos 30°}\pi\right)^2 + \text{pitch}^2} \quad \text{Eq. 5}$$

$$L2 = \sqrt{\left(\frac{D}{\cos 30°}\pi\right)^2 + \text{pitch}^2} \quad \text{Eq. 6}$$

The diameter of the enveloping circle circumscribing the three cores having spacers is expressed by Eq. 7 provided below. From Equations 1, 5, 6, and 7, there is selected "t" which satisfies $0.3\% \leq A1$ and such that the diameter of the enveloping circle circumscribing the three cores having spacers becomes $\leq 93$ mm.

$$\frac{t+D}{\cos 30°} + D \quad \text{Eq. 7}$$

<Result of Trial Calculation>

Figure 6:
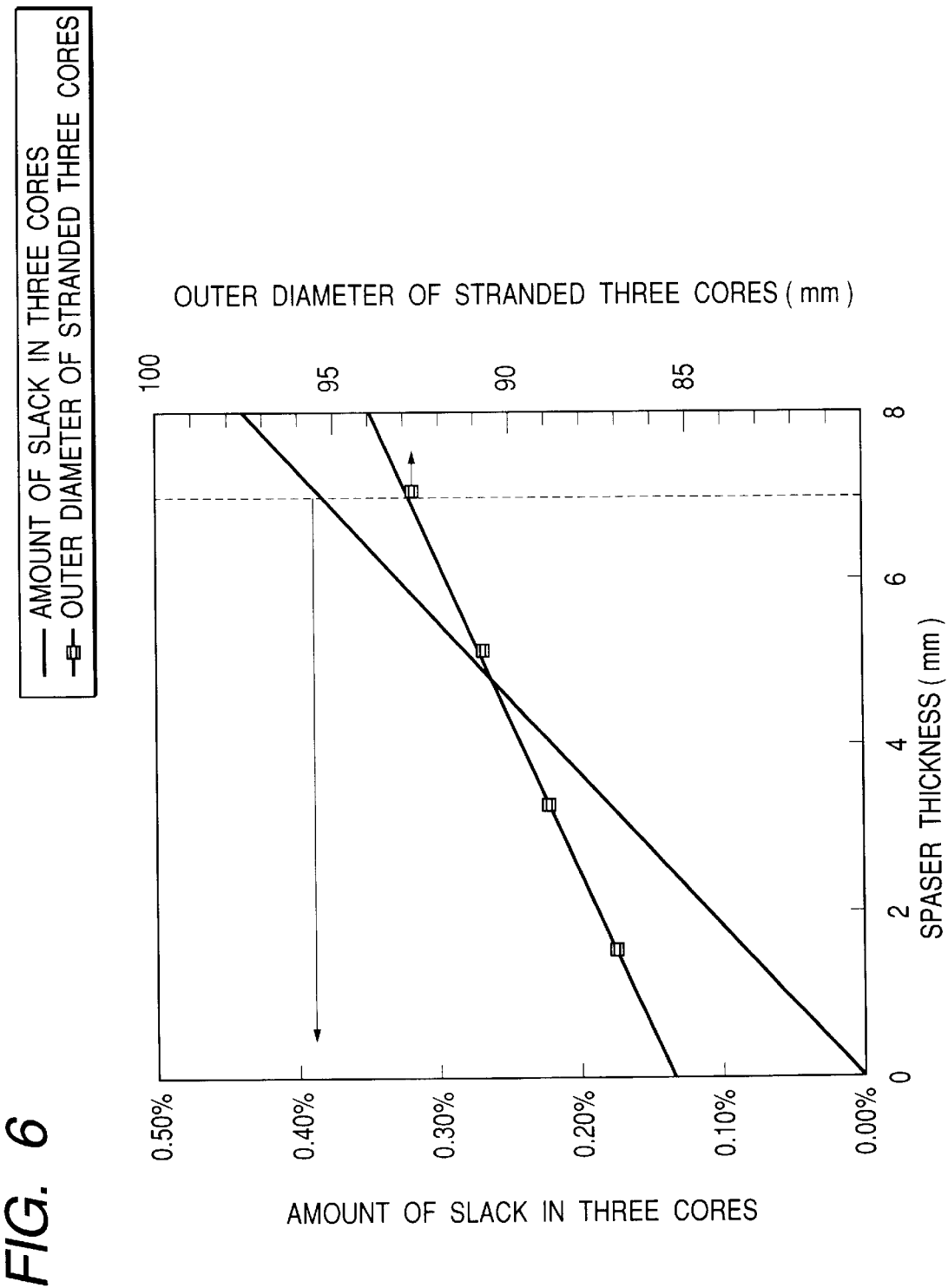
FIG. 6 is a graph showing a relationship between a spacer thickness and an amount of design slack, and a relationship between a spacer thickness and a diameter of an enveloping circle circumscribing three cores having spacers.

Trial calculation was carried out in accordance with the procedures set forth. A graph shown in FIG. 6 denotes a relationship between the spacer thickness and the amount of design slack, and a relationship between the spacer thickness and the diameter of an enveloping circle circumscribing the three cores having spacers.

As is found through review of a spacer thickness which assures maximum slack for strands of three cores and which inhibits damage to the cores at the time of manufacture of the corrugated inner pipe, a design slack of about 0.4% is achieved by adoption of a spacer having a thickness of 7 mm.

The example trial calculation has described the case of three cores. Even when the number of cores is less than or greater than three, a spacer thickness is determined on the basis of the same concept and in the same manner.

As has been described, under a method of manufacturing a superconducting cable according to the present invention, cores can be housed in a thermally insulated pipe with sufficient slack for managing thermal contraction, by temporarily interposing spacers between cores. Hence, there can be manufactured a superconducting cable capable of managing thermal contraction without integrating another member with cable cores.

What is claimed is:

1. A method of manufacturing a superconducting cable comprising:

providing spacers in a plurality of cores at the time of stranding of the cores; and removing the spacers before the stranded cores are housed in a thermally insulated pipe, and housing the cores into the thermally insulated pipe while the strands are held in a slacked state.

2. The method of manufacturing a superconducting cable according to claim 1, wherein the thickness of each of the spacers satisfies the following requirements:

(1) an amount of required slack $A0 \leq$ an amount of design slack A1, where the amount of required slack A0 is expressed by a rate of contraction of the core, and the amount of design slack is expressed as $\{(L1/L2)-1\}100$, provided that the length of one pitch of the cores having the spacers is taken as L1 and the length of one pitch of cores not having spacers is taken as L2; and (2) a diameter of an enveloping circle $\leq$ an inner diameter B of the thermally insulated pipe, where the diameter of the enveloping circle corresponds to the diameter of a circle circumscribing the stranded cores having spacers.

3. The method of manufacturing a superconducting cable according to claim 1, further comprising:

covering an outer circumferential surfaces of strands of the cores with a metal plate; and removing the spacers before the cores are introduced into a welder and welding joints between the metal plates by the welder.

4. The method of manufacturing a superconducting cable according to claim 1, further comprising:

removing the spacers before the cables are introduced into an extruder and extruding metal to an outer circumferential surface of the cores by the extruder.

5. The method of manufacturing a superconducting cable according to claim 1, further comprising:

drawing the spacers from grooves between the stranded cores and taking up the spacers.

* * * * *